United States Patent [19]

Sato

[11] Patent Number: 5,632,266
[45] Date of Patent: May 27, 1997

[54] FRYER

[76] Inventor: Tadayoshi Sato, 4-32-13 Machiya, Arakawa-ku Tokyo, Japan

[21] Appl. No.: 434,926

[22] Filed: May 4, 1995

[30] Foreign Application Priority Data

| May 20, 1994 | [JP] | Japan | 6/131033 |
| May 17, 1994 | [JP] | Japan | 6/126899 |
| Dec. 9, 1994 | [JP] | Japan | 6/331557 |

[51] Int. Cl.⁶ .......................... A47J 27/026; A47J 27/00
[52] U.S. Cl. ........................ 126/391; 99/403; 99/408
[58] Field of Search ........................ 126/391, 390; 99/403, 408; 210/256, 257.1, 534, 540, DIG. 8

[56] References Cited

U.S. PATENT DOCUMENTS

| 306,168 | 10/1884 | Moseley | 210/540 |
| 2,535,905 | 12/1950 | Dawson. | |
| 4,580,549 | 4/1986 | Sato. | |
| 4,603,622 | 8/1986 | Beck | 210/DIG. 8 X |

FOREIGN PATENT DOCUMENTS

| 4529261 | 11/1970 | Japan. |
| 8001007 | 9/1981 | Netherlands. |

Primary Examiner—Carl D. Price
Attorney, Agent, or Firm—Lucas & Just

[57] ABSTRACT

The fryer has a frying vessel provided with an oil tank therein for storing hot oil during the cleaning operation. Cooling the oil and water boundary is accomplished by providing recessed portions in the walls of the frying vessel and by placing cooling pipes in the top of the tank. During frying, the tank itself is used as a cooling source for the water in the fryer.

12 Claims, 9 Drawing Sheets

FRYER

BACKGROUND OF THE INVENTION

Industrial Field of Invention

This invention relates to an apparatus for frying food and more particularly to a fryer having a frying vessel wherein an oil bath is positioned in the upper portion of the frying vessel and a water bath is positioned in the lower portion of the frying vessel.

Prior Art

U.S. Pat. No. 4,580,549 teaches a fryer having a frying vessel wherein an oil bath is positioned in the upper portion of the vessel and a water bath is positioned in the lower portion of the frying vessel. The frying vessel of the '549 patent teaches that the boundary area between the oil bath and the water bath is cooled by means of a plurality of air intake pipes that run horizontally through the frying vessel from front to back and connect to the outside of the frying vessel. Cooling the boundary area allows bits of food and fried batter that became dislodged from the frying food to float down to the bottom of the frying vessel thereby minimizing oxidation of the frying oil caused by these bits of food and batter. Cooling the boundary area also helps to prevent water from rising to the top of the oil bath and forming steam or bubbles on the surface of the oil bath. Minimizing the oxidation of the frying oil allows the oil to be reused rather than discarded.

It has been found that using a plurality of air intake pipes to cool the boundary area between the water and the oil results in a high cost for fabrication of the fryer because these cooling pipes are each welded individually to the external wall of the oil bath. Additionally, the plurality of the pipes makes cleaning of the interior of the frying vessel difficult because of the number and closeness of the cooling pipes to each other and to the side walls of the frying vessel itself.

Another problem has also been found associated with the storage of the hot frying oil during cleaning of the frying vessel. Because these types of fryers prolong the life of the frying oil, it is possible to save the oil between cleanings and to reuse the oil. A problem has arisen as to how to safely and efficiently store the oil between cleanings. During frying, the oil has a temperature of around 200° C. It is both dangerous and troublesome to remove the hot oil from the frying vessel prior to cleaning. To allow the hot oil to cool to a safe temperature for handling takes a great deal of time and slows the cleaning process.

There is a need for a means to safely and efficiently store the hot oil during cleaning. There is also a need to reduce the number of air pipes used to cool the oil and water boundary area thereby reducing the cost for fabrication.

SUMMARY OF THE INVENTION

A safe and efficient means for storing the hot oil from the oil bath in the frying vessel during the cleaning operation has now been discovered. Also a means for reducing the number of air pipes used for cooling the oil and water boundary area has been discovered.

Broadly, the means for storing the hot oil from the oil bath is a tank positioned inside the frying vessel with over half of the tank positioned in the water bath and the top of the tank at or near the oil and water boundary. The top of the tank has an inlet port which is in fluid communication with the interior of the frying vessel and the bottom of the tank has an outlet port which is in fluid communication with the exterior of the frying vessel. The outlet port is equipped with a valve to open and close the port. Preferably, the inlet also has a valve to open and close the port.

In order to reduce the number of air pipes used for cooling the oil and water boundary area it is preferred that the frying vessel has one or more recessed portions formed in the vertical wall of the frying vessel which run in or near the same plane as the air cooling pipes and in the same direction, front-to-back or side-to-side, as the air cooling pipe. The air cooling pipes run either front to back or side to side.

In one preferred embodiment, the air cooling pipes are integral with and are formed in the top of the tank used for storing the hot oil.

DETAILED DESCRIPTION OF THE INVENTION

Figure 1:
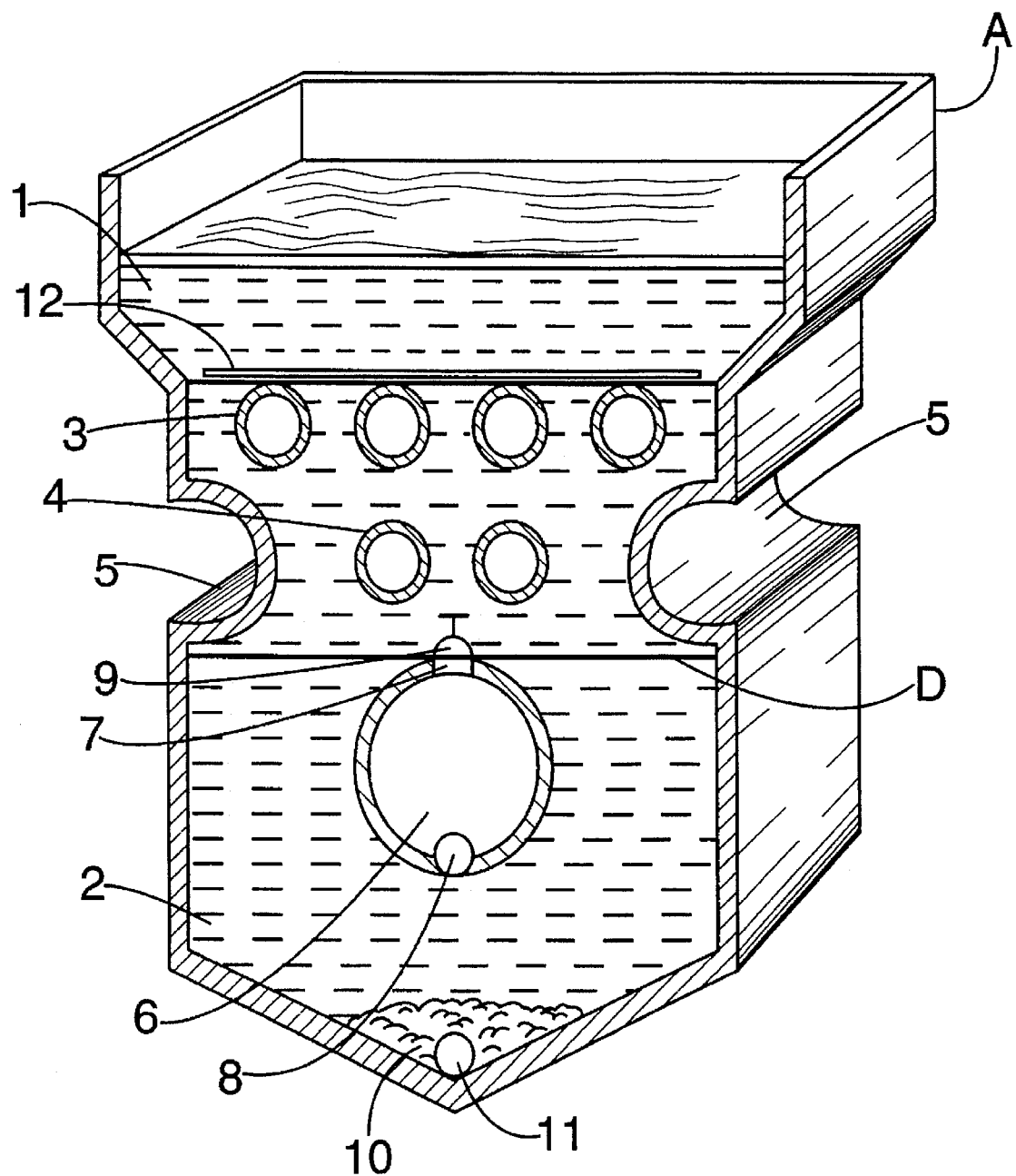
FIG. 1 illustrates a perspective view of a cross-section of a fryer made in accordance with the present invention having both a recessed portion running from front to back for cooling and a tank for storing frying oil in accordance with the present invention.

As shown in FIG. 1, inside frying vessel A is oil bath 1 on top of water bath 2. The oil and water boundary is marked D. Due to the difference in specific gravity between the frying oil and the water, the oil naturally floats on top of the water.

Figure 8:
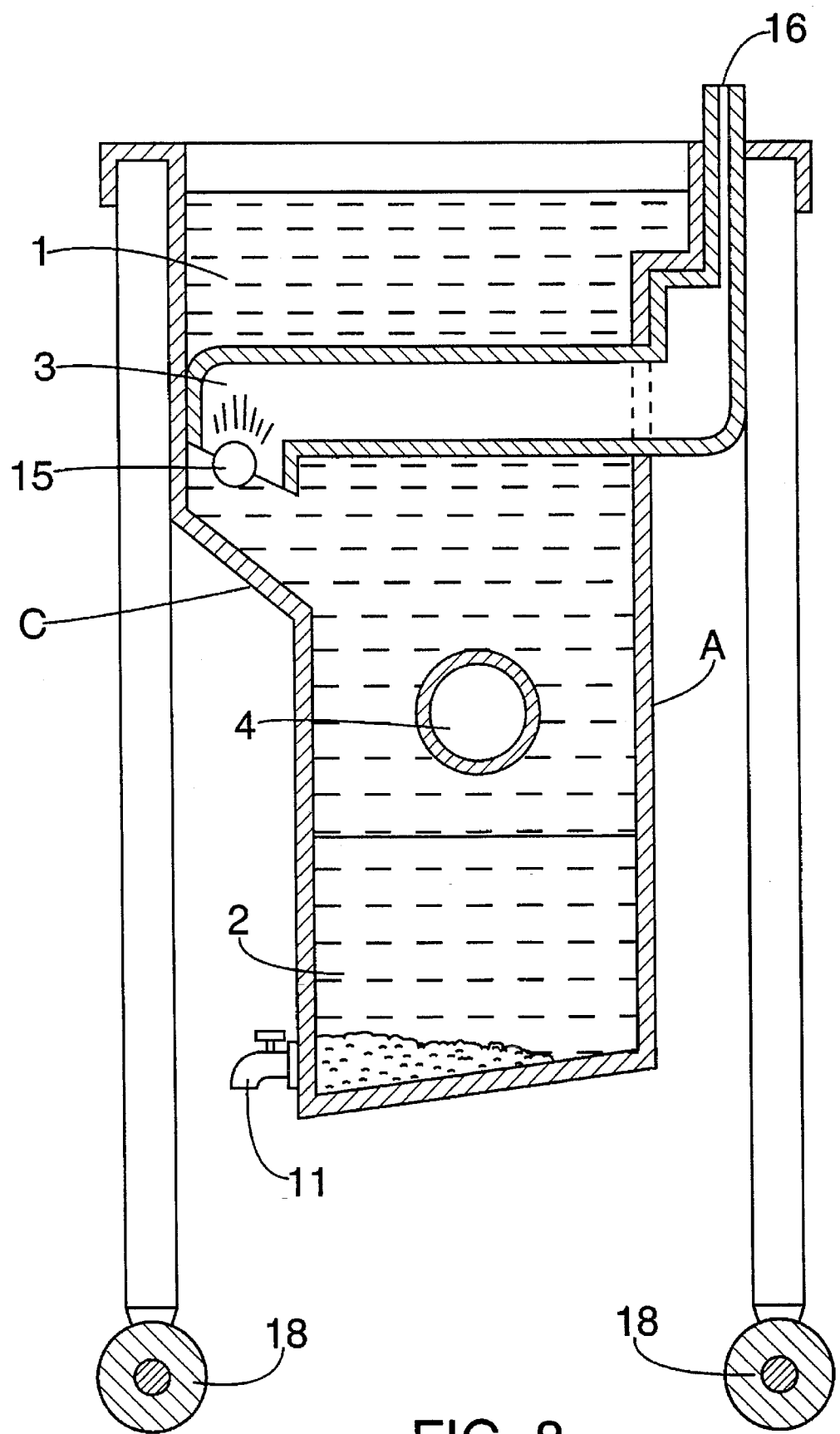
FIG. 8 illustrates a cross sectional view of the embodiment shown in FIG. 7 viewed from the right side.

Near the surface of oil bath 1 is heating source 3 for heating the oil to a temperature suitable for frying food. Heating source 3 can be any conventional heating source such as a gas burner or an electrical heating element. FIG. 8 depicts gas burner 15 as a heating source with an exhaust vent 16.

Below heating source 3 and positioned in oil bath 1, above oil and water boundary D, are two of air cooling pipes 4. Air cooling pipes 4 run from front-to-back of frying vessel A.

In this embodiment, the number of air cooling pipes can be remarkably reduced to a single pipe. The efficiency of the cooling effect is as good as a plurality of air cooling pipes running from front to back where the length between the front surface and the back surface is shorter than the upper portion of the oil bath as shown in FIG. 8.

The surface of the upper portion of the oil bath is large enough for dealing with frying food.

Air cooling pipe 4 can have any arbitrary cross-sectional configuration.

Figure 7:
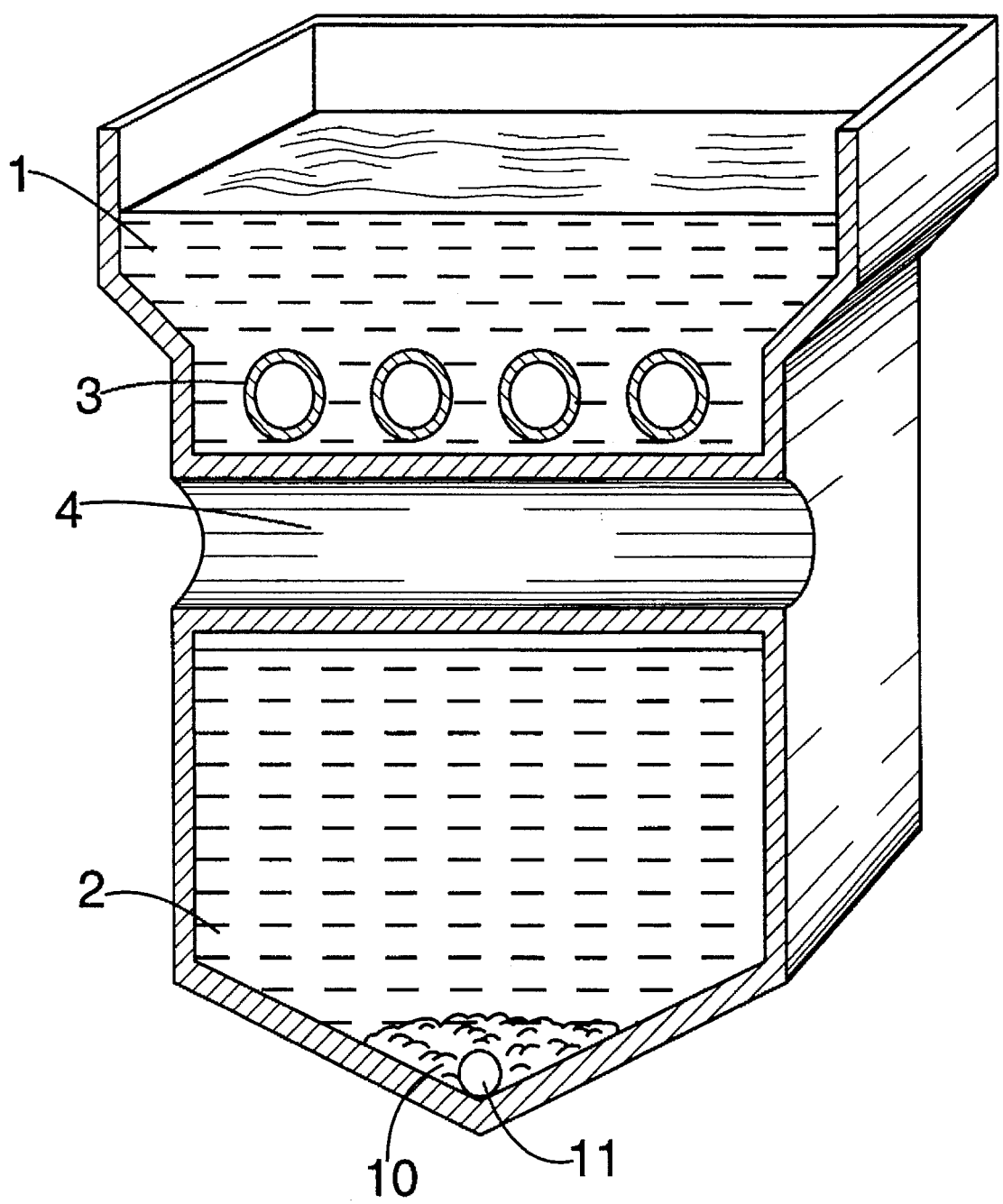
FIG. 7 illustrates another embodiment in accordance with the present invention having a single air cooling pipe running from side to side.
Figure 9:
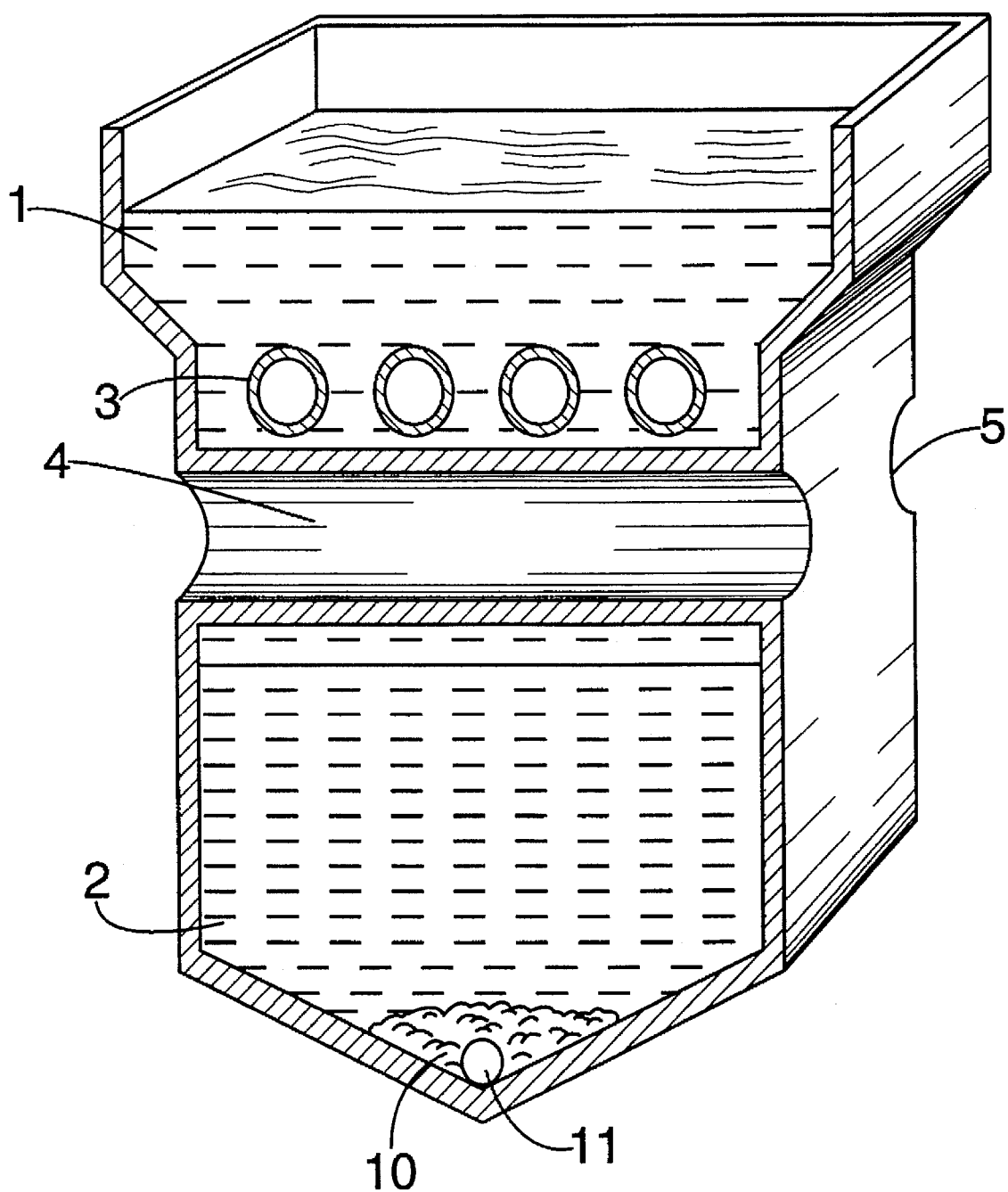
FIG. 9 illustrates another embodiment in accordance with the present invention having both a recessed portion running from side to side and a single air cooling pipe below a heating source in oil, both in parallel to the recessed portion.

FIGS. 7–9 all depict circular cross-sectional design, however, any cross-sectional shape can be employed.

Also shown in FIG. 1 running from front-to-back of frying vessel A are recessed portions 5. Recessed portions 5 are positioned in the side walls of vessel A and are located below the horizontal plane in which heating source 3 resides. Recessed portion 5 may be of an arbitrary configuration such that the surface area of the side of oil bath 1 is made larger.

Frying vessel A can have one or more recessed portion 5 and recessed portion 5 can run front-to-back or side-to-side of frying vessel A. FIG. 1 depicts two recessed portion 5 running front-to-back while FIG. 9 illustrates one recessed portion 5 running side-to-side. Additionally recessed portion 5 may be formed such that it is at or near the oil and water boundary.

Employing one or more of the means for cooling as disclosed herein allows for a reduction in the number of cooling pipes compared to the teaching of the prior art in U.S. Pat. No. 4,580,549. Preferably, the cooling means employs both the air cooling pipes and a recessed portion in both side walls as depicted in FIG. 1.

Figure 3:
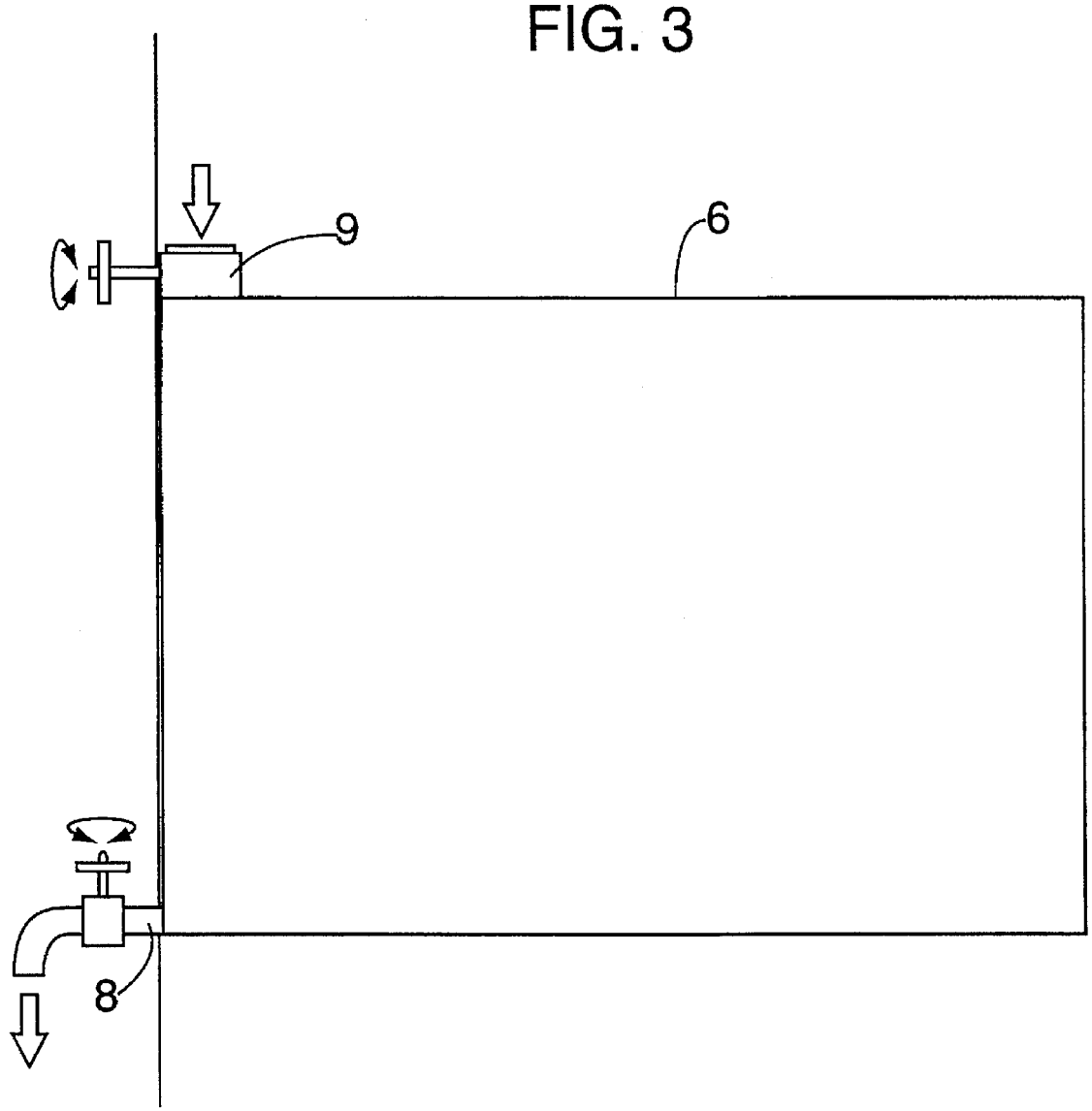
FIGS. 3–5 illustrate cross-sections of tanks for storing frying oil in accordance with the present invention.
Figure 4:
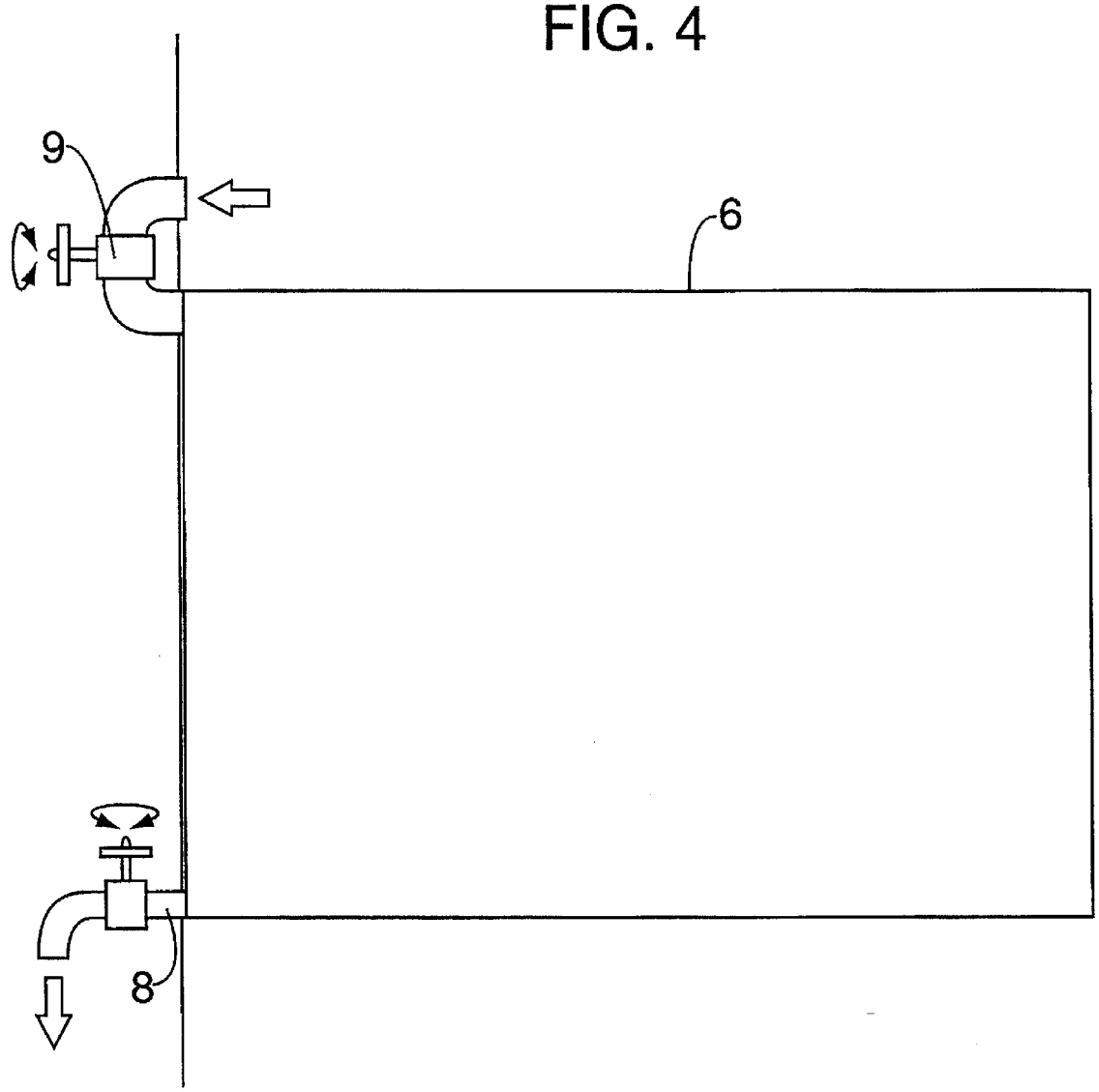
Figure 5:
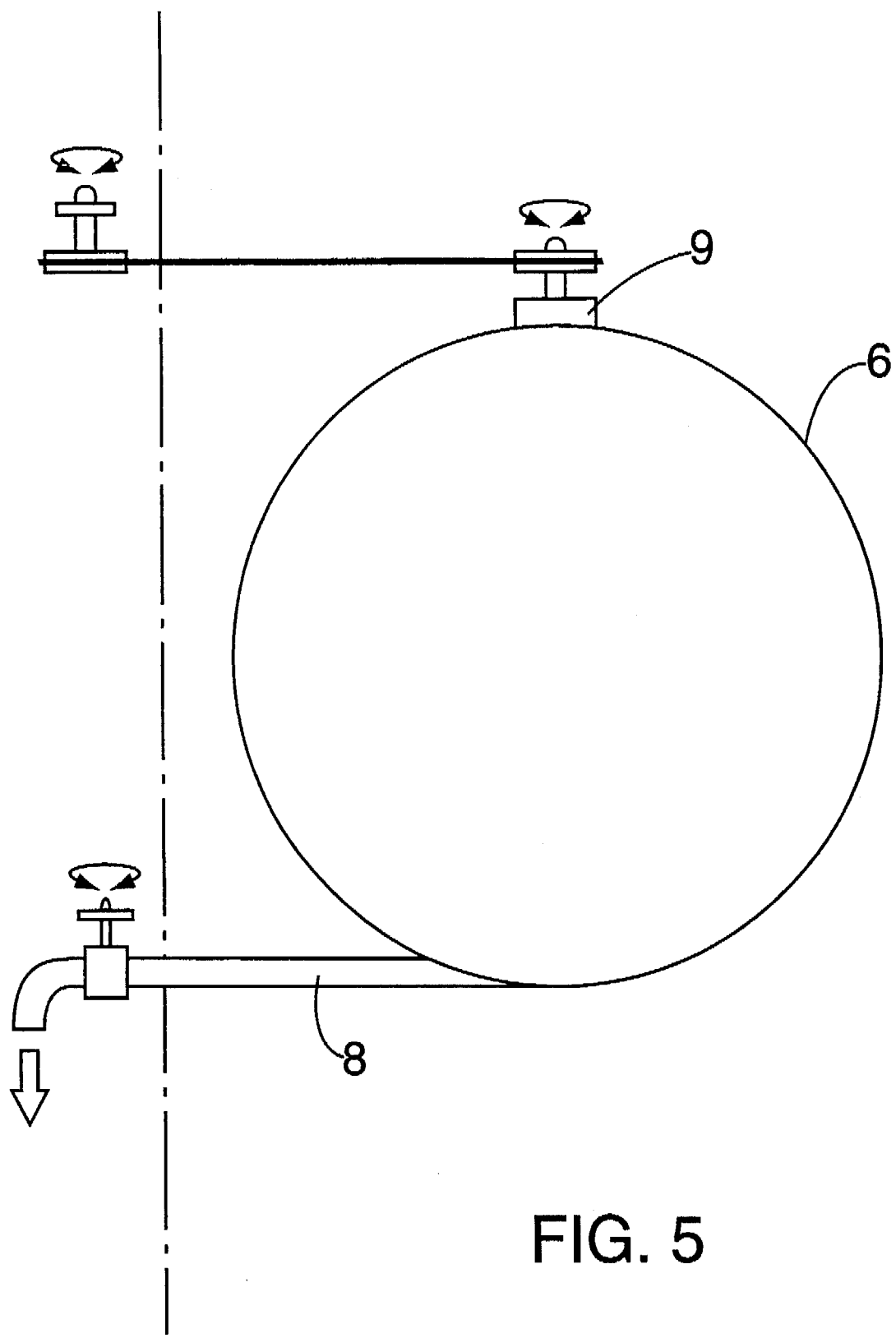

FIG. 1 also illustrates tank 6 for storing hot oil during the cleaning operation. Tank 6 has an inlet port 7 and an outlet port 8. Preferably, inlet port 7 is equipped with valve 9 to provide a means for opening and closing inlet port 7. Outlet port 8 must have a valve means to allow it to be opened and closed. FIGS. 3–5 illustrate various configurations for inlet port 7, outlet port 8 and valve 9. Inlet port 7 is in fluid communication with the interior of frying vessel A and allows for fluid flow between the interior of tank 6 and the interior of frying vessel A. Outlet port 8 is in fluid communication with the exterior of frying vessel A and allows for fluid flow between the interior of tank 6 and the exterior of frying vessel A.

Figure 2:
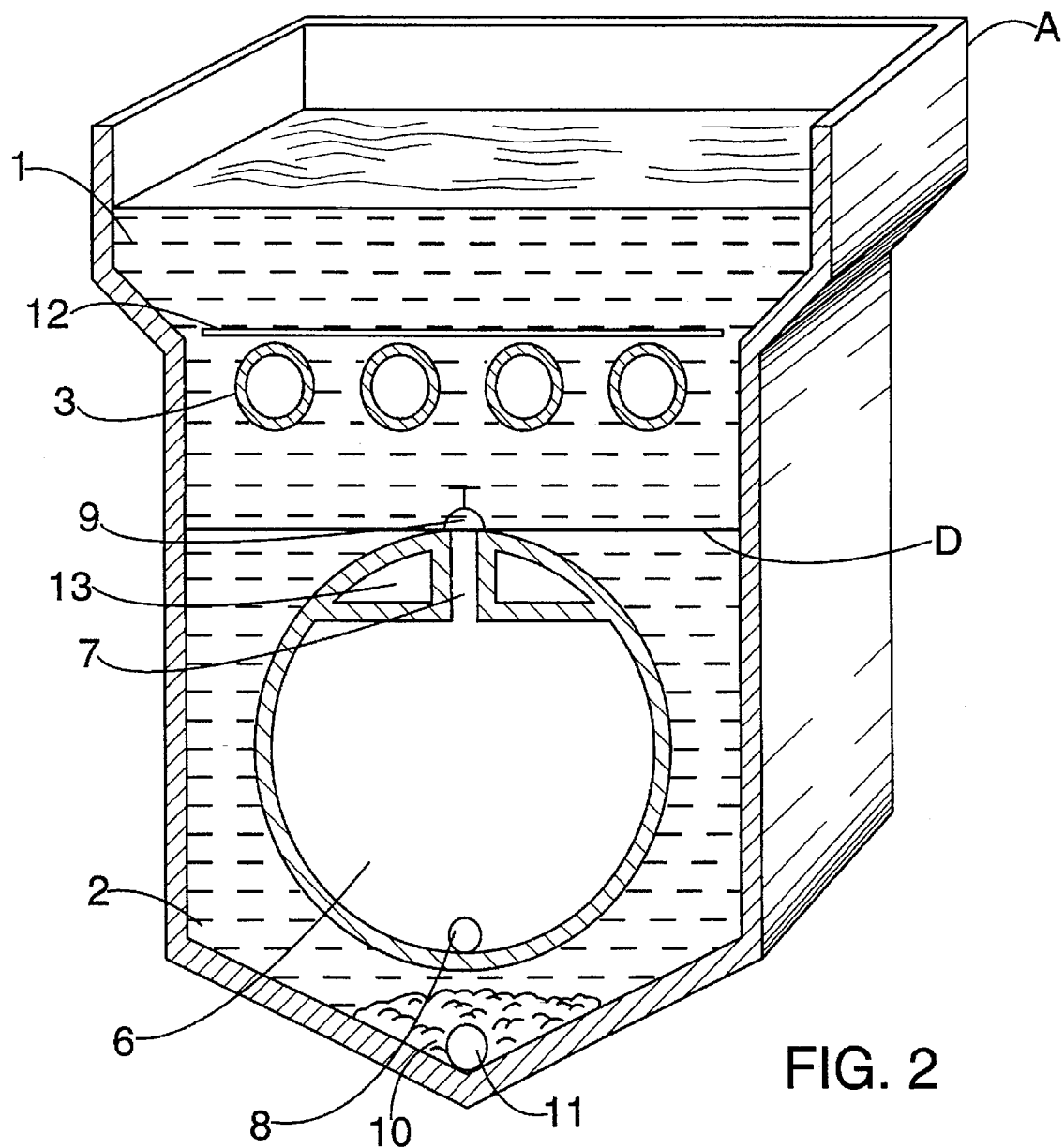
FIG. 2 illustrates a perspective view of a cross-section of a fryer made in accordance with the present invention having a tank for storing frying oil and cooling pipes integral in said tanks.

Also depicted in FIGS. 1 and 2 are bits of fried food and batter 10 which have settled to the bottom of frying vessel A. Frying vessel A is equipped with an outlet port 11 to allow the frying vessel to be completely drained.

Inlet port 7 is positioned at or near oil and water boundary D. The shape and size of inlet port 7 is arbitrary but preferably is circular in cross-section and has a diameter of about 3 to 5 cm.

The operation of tank 6 in relation to its filling and emptying and the frying vessel will now be described.

In one embodiment, during the frying operation, oil tank 6 is filled with water and valve 9 and the valve of outlet port 8 are in the closed state.

When the frying operation is finished and it is time to clean the frying vessel and there is water in tank 6, the way for moving the oil from oil bath 1 into tank 6 is:

open the valve of outlet port 8 and drain the water from tank 6 after draining the water off, close the valve of outlet port 8 and open valve 9 to let the oil in oil bath 1 flow into tank 6 thereafter, when the oil in oil bath 1 is completely stored in tank 6, close valve 9.

Another way is to:

open both valve 9 and the valve of outlet port 8. Then the oil in oil bath 1 flows into tank 6 and water is drained out of tank 6, simultaneously.

Then close the valve of outlet port 8 at the moment when the water in tank 6 is drained off and all the frying oil from oil bath 1 is stored in tank 6.

When all the frying oil in oil bath 1 has drained into tank 6, the valve of outlet port 11 is opened to drain the water from water bath 2 so as to empty the frying vessel and to ready the vessel for cleaning. The vessel is now safe for cleaning.

In another embodiment, during the frying operation valve 9 is closed and the valve of outlet port 8 is opened to tank 6 such that during the frying operation tank 6 contains air, not water. In this manner tank 6 is connected to the outside and performs the function of an air cooling space similar to air cooling pipes 4 and recessed portion 5. The air from outside ventilates oil tank 6 and prevents the increase of the temperature of water bath 2 during the frying operation. In this case, the valve of outlet port 8 is closed before opening valve 9 to drain the oil into tank 6 during cleaning.

The means for opening and closing valve 9 is not essential and can be left out. Without valve 9, tank 6 is always filled with water during frying and the valve of outlet port 8 is closed when the fryer is used to fry food. At the end of the frying operation, when it is time to empty the frying vessel, the valve of outlet port 8 is opened to drain the water from tank 6. Simultaneously, oil in oil bath 1 flows into tank 6. At the moment when the oil in oil bath 1 is completely transferred into tank 6, the valve of outlet port 8 is closed.

When the cleaning is done and it is time to ready the fryer for a frying operation, water is added to the frying vessel. The water causes the oil stored in tank 6 to float out of tank 6 and to create oil bath 1 for the next frying operation. Prior to putting water into the frying vessel, it is necessary to close the valve of outlet port 11 and to open valve 9 (when the present invention is equipped with valve 9).

When the water flows into the frying vessel it flows into tank 6 and the oil in tank 6 rises out of inlet port 7 and creates oil bath 1 due to the difference in specific gravity between water and oil.

As shown in FIG. 5, the shape of tank 6 in water bath 2 is a sphere. This shape allows the heat to radiate efficiently from tank 6. However, tank 6 can be rectangular, square or cylindrical in shape. Spherical and cylindrical are preferred.

In another embodiment of tank 6 according to the invention, as shown in FIG. 2 air cooling space 13 is provided in the upper portion of tank 6 and inlet port 7 is provided therebetween. In this case, air cooling space 13 takes the place of air cooling pipes 4. In this embodiment air cooling pipes 4 and recess portion 5 are not needed.

Air cooling space 13 is connected to the outside of frying vessel A. A connection to the outside of frying vessel A is made by connecting a path to the outside of frying vessel A.

Furthermore, air cooling space 13 cools the water in water bath 2 in the upper portion of the water bath 2, facing the oil bath 1. Additionally, the oil in oil bath 1 around the boundary is indirectly cooled by the water cooled by air cooling space 13.

Preferably, the top of tank 6 is at or below oil and water boundary D. However, the oil and water boundary can be made at a lower position than the top of tank 6 by reducing the amount of water in water bath 2. In this case, the oil in oil bath 1 is directly cooled by the air in air cooling space 13. When the boundary between the water and the oil is below inlet 7, water should be added to the frying vessel so as to raise the level of the oil to the level of inlet 7 prior to storing the oil in tank 6.

Alternatively, inlet 7 of tank 6 is provided at a lower position than air cooling space 13, and the oil and water boundary is placed at or near inlet 7 so that oil bath 1 can be directly cooled down by air cooling space 13.

Where the oil and water boundary is remote from heating source 3, the boundary between the oil and the water will not be heated to as high a temperature and it is not necessary to cool the oil in oil bath 1. In this case, cooling pipes 4, recess portion 5 and air cooling space 13 are not essential for this invention.

Accordingly, the cleaning operation can be started quickly after the frying operation has stopped. By storing the heated oil in tank 6, the frying vessel can be cleaned immediately. This means that an efficient and safe frying operation is achieved without having to remove the oil from the frying vessel or return it again to the frying vessel for another frying operation, since the oil remains in the frying vessel during the cleaning operation, albeit stored in tank 6.

Furthermore, the oil stored in tank 6 can move up through inlet 7 into the frying vessel by water introduced into the frying vessel. Thus the oil can form the oil bath in the upper portion of the frying vessel thereby allowing for reuse as the frying oil. This allows for repeated use of the oil and for easy operation of the fryer.

Furthermore, the tank 6 functions as a kind of cooling space to efficiently cool the fryer during the frying operation when the tank 6 is empty and connected to the outside for ventilation as described above.

When air cooling space 13 is provided at the upper portion of tank 6, the space can be made with the tank as one body. Therefore, it is easier to make tank 6 compared to providing discrete air cooling pipes 4 in the frying vessel.

The fryer is also equipped with a thermostat 17 for controlling heat source 3 and rollers 18 for adjusting the balance of the fryer against the floor to be fixed.

Figure 6:
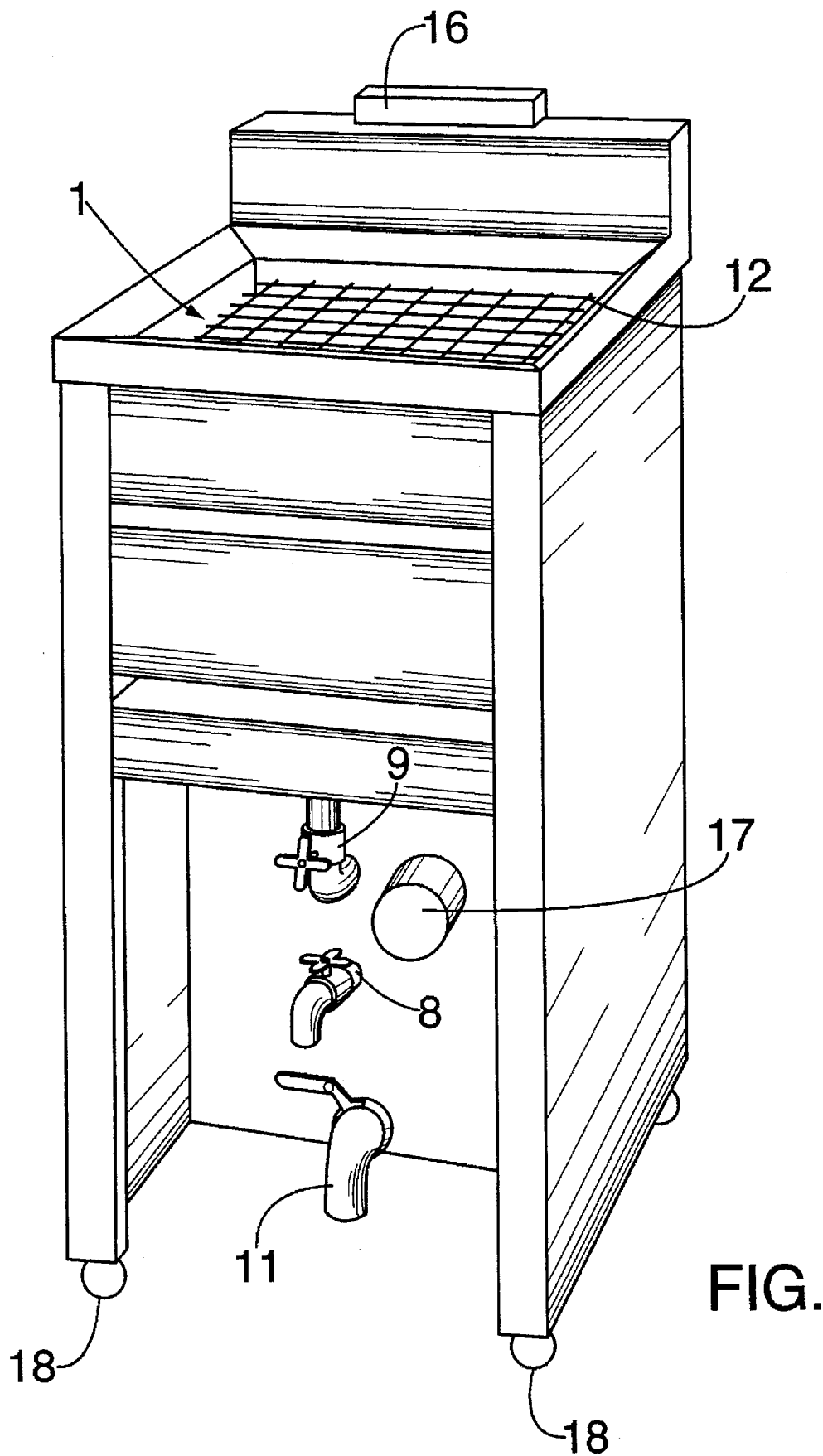
FIG. 6 illustrates a perspective view of a fryer with a single oil bath in accordance with the present invention.

A net 12 shown in FIG. 6 prevents frying food from dropping down to the bottom of the frying vessel.

Fryers shown in FIGS. 7 to 9 are the embodiments of a frying vessel with air cooling pipe 4 running from side to side at the lower portion of the oil bath 1, where the length between the front surface and the back surface is shorter than that of the upper portion.

Therefore, the number of the necessary air cooling pipe 4 can be remarkably reduced in comparison with the case in which the air cooling pipe 4 runs from the front surface to the back surface in the same way as the heating source 3 in the oil bath 1.

Fryers shown in FIGS. 7 to 9 do not have an oil tank in the frying vessel.

It will be understood that the claims are intended to cover all changes and modifications of the preferred embodiments of the invention herein chosen for the purpose of illustration which do not constitute a departure from the spirit and scope of the invention.

What is claimed is:

1. An apparatus for frying food comprising:
   (a) a frying vessel having a front wall, a back wall, two side walls, a bottom and an open top which define an interior and an exterior of said frying vessel, said interior of said frying vessel for containing an oil bath in which food is fried and a water bath positioned below said oil bath, said oil bath and water bath interfacing at an oil and water boundary, said oil bath being housed in an upper portion of said frying vessel and said water bath housed in a lower portion of said frying vessel, said lower portion of said frying vessel having a distance between said front wall and said back wall which is shorter than the distance between said front wall and said back wall in said upper portion of said frying vessel;
   (b) a heating means for heating oil in said oil bath to a temperature suitable for frying food, said heating means arranged in said oil bath in said upper portion of said frying vessel; and
   (c) an air cooling pipe which runs horizontally between said two side walls of said frying vessel and positioned below said heating means in said lower portion of said frying vessel, said cooling pipe being open at both ends to allow air to flow through said cooling pipe.

2. An apparatus for frying food comprising:
   (a) a frying vessel having side walls, a bottom and an open top which define an interior and an exterior of said frying vessel, said interior of said frying vessel containing an oil bath in which food is fried and a water bath positioned below said oil bath, said oil bath and water bath interfacing at an oil and water boundary;
   (b) a heating means for heating oil in said oil bath to a temperature suitable for frying food, said heating means arranged in said oil bath of said frying vessel;
   (c) a cooling means for cooling both oil and water, said cooling means arranged in said frying vessel below said heating means, said cooling means comprising:
      (c1) a recessed portion in at least one of said side walls of said frying vessel; and
      (c2) at least one cooling pipe which runs in said interior of said frying vessel, horizontally between opposite walls of said frying vessel, said cooling pipe running parallel to said recessed portion, said cooling pipe being open at both ends to allow air to flow through said cooling pipe.

3. The apparatus of claim 2 wherein said recessed portion comprises:
   (a) a first recessed portion in one of said side walls of said frying vessel;
   (b) a second recessed portion in another of said side walls of said frying vessel, said one side wall being opposite said other side wall; and
   (c) said cooling pipe running parallel to said first recessed portion and said second recessed portion.

4. An apparatus for frying food comprising:
   (a) a frying vessel having side walls, a bottom and an open top which define an interior and an exterior of said frying vessel, said interior of said frying vessel containing an oil bath in which food is fried and a water bath positioned below said oil bath, said oil bath and water bath interfacing at an oil and water boundary;
   (b) a heating means for heating oil in said oil bath to a temperature suitable for frying food, said heating means arranged in said oil bath of said frying vessel;
   (c) a cooling means for cooling both oil and water, said cooling means arranged in said frying vessel below said heating means;
   (d) a storage tank for storing oil from said oil bath during cleaning operations of said frying vessel, said storage tank positioned in the interior of said frying vessel below said cooling means, said tank comprising:
      (d1) an inlet port for draining said oil from said frying vessel into said storage tank when said frying vessel is cleaned and for returning said oil bath to said frying vessel after cleaning of said frying vessel;
      (d2) an outlet for fluid communication between said storage tank and the exterior of said frying vessel; and
      (d3) a outlet valve for opening and closing of said outlet and arranged in said outlet.

5. The apparatus of claim 4 further comprising an inlet valve for opening and closing said inlet, said inlet valve arranged in said inlet.

6. The apparatus of claim 4 further comprising an outlet port arranged in said frying vessel for fluid communication between the interior of said frying vessel and the exterior of said frying vessel.

7. The apparatus of claim 4 wherein said cooling means comprises an air cooling space positioned in said storage tank, said air cooling space being in fluid communication with the exterior of said frying vessel.

8. The apparatus of claim 4 wherein said cooling means comprises a recessed portion in at least one of said side walls of said frying vessel.

9. The apparatus of claim 4 wherein said cooling means comprises at least one cooling pipe which runs horizontally between opposite walls of said frying vessel, said cooling pipe being open at both ends to allow air to flow through said cooling pipe.

10. The apparatus of claim 4 wherein said cooling means comprises:

(a) a recessed portion in at least one of said side walls of said frying vessel; and (b) at least one cooling pipe which runs in said interior of said frying vessel horizontally between opposite walls of said frying vessel, said cooling pipe running parallel to said recessed portion, said cooling pipe being open at both ends to allow air to flow through said cooling pipe.

11. The apparatus of claim 4 wherein said cooling means comprises:

(a) a first recessed portion in one of said side walls of said frying vessel; and (b) a second recessed portion in another of said side walls of said frying vessel, said one wall being opposite said other wall.

12. The apparatus of claim 4 wherein said cooling means comprises:

(a) a first recessed portion in one of said side walls of said frying vessel;

(b) a second recessed portion in another of said side walls of said frying vessel, said one side wall being opposite said other side wall; and (c) at least one cooling pipe which runs in said interior of said frying vessel horizontally between opposite walls of said frying vessel, said cooling pipe running parallel to said first recessed portion and said second recessed portion, said cooling pipe being open at both ends to allow air to flow through said cooling pipe.

* * * * *